(12) United States Patent
Gollier et al.

(10) Patent No.: US 11,852,836 B2
(45) Date of Patent: Dec. 26, 2023

(54) DIRECTIONAL ILLUMINATOR AND DISPLAY DEVICE WITH PUPIL STEERING BY TILTABLE REFLECTOR

(71) Applicant: Meta Platforms Technologies, LLC, Menlo Park, CA (US)

(72) Inventors: Jacques Gollier, Sammamish, WA (US); Fenglin Peng, Redmond, WA (US); Ying Geng, Bellevue, WA (US); Anqi Ji, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 296 days.

(21) Appl. No.: 17/374,888

(22) Filed: Jul. 13, 2021

(65) Prior Publication Data

US 2023/0014577 A1 Jan. 19, 2023

(51) Int. Cl.
*G02B 27/01* (2006.01)
*G02B 26/08* (2006.01)
*G02B 27/00* (2006.01)
*G02B 27/28* (2006.01)

(52) U.S. Cl.
CPC ..... *G02B 27/0179* (2013.01); *G02B 26/0833* (2013.01); *G02B 27/0093* (2013.01); *G02B 27/0172* (2013.01); *G02B 27/286* (2013.01); *G02B 2027/0174* (2013.01); *G02B 2027/0187* (2013.01)

(58) Field of Classification Search
None
See application file for complete search history.

(56) References Cited

U.S. PATENT DOCUMENTS

| 2018/0120559 A1 | 5/2018 | Yeoh et al. |
| 2021/0033856 A1 | 2/2021 | Zhang et al. |
| 2021/0080719 A1 | 3/2021 | Amirsolaimani et al. |

FOREIGN PATENT DOCUMENTS

| CN | 109407313 A | * | 3/2019 | ......... G02B 27/0101 |
| CN | 109407313 B | | 2/2020 | |

OTHER PUBLICATIONS

International Search Report and Written Opinion for International Application No. PCT/US2022/036880, dated Oct. 6, 2022, 14 pages.

* cited by examiner

*Primary Examiner* — Bao-Luan Q Le
*Assistant Examiner* — Danell L Owens
(74) *Attorney, Agent, or Firm* — Pequignot + Myers; Matthew A. Pequignot

(57) ABSTRACT

A directional illuminator includes a light source, a pupil-replicating lightguide, and a tiltable reflector coupling the light source to the pupil-replicating lightguide. The exit beam angle of the light outputted by the pupil-replicating lightguide follows the in-coupling angle, and accordingly depends on the tilting angle of the tiltable reflector. The directional illuminator with steered light beam may be used to illuminate a display panel. Steering the illuminating light by the tiltable reflector enables one to steer the exit pupil of the display device to match the user's eye location(s).

17 Claims, 13 Drawing Sheets

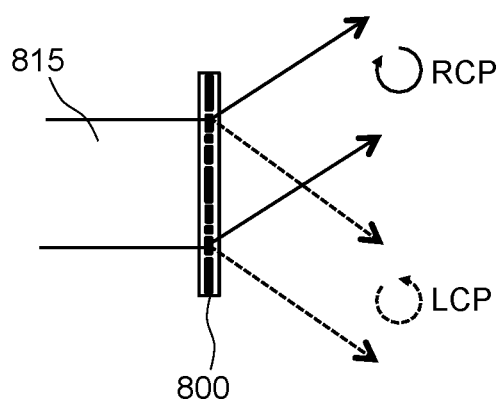
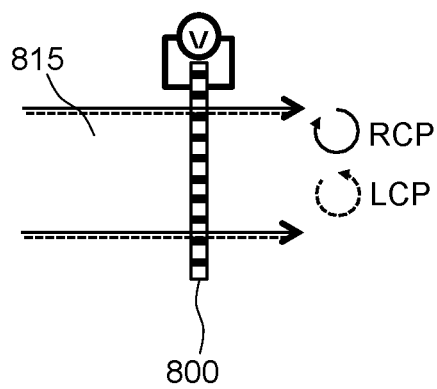
FIG. 8A
FIG. 8B

DIRECTIONAL ILLUMINATOR AND DISPLAY DEVICE WITH PUPIL STEERING BY TILTABLE REFLECTOR

TECHNICAL FIELD

The present disclosure relates to optical devices, and in particular to visual display systems, and components and modules therefor.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED, e.g. a headset or a pair of glasses, configured to present content to a user. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by seeing through a "combiner" component. The combiner component of a wearable display is typically transparent to external light but includes some light routing optic to direct the display light into the user's field of view.

Compact and energy-efficient display devices are desired for head-mounted display systems. Because a display of HMD/NED is usually worn on the head of a user, a large, bulky, unbalanced, and/or heavy display device with a heavy battery would be cumbersome and uncomfortable for the user to wear. Compact display devices require compact and energy-efficient light sources, image projectors, lightguides, focusing optics, and so on.

BRIEF DESCRIPTION OF THE DRAWINGS

Exemplary embodiments will now be described in conjunction with the drawings, in which:

FIGS. 8A and 8B are side schematic views of the active PBP LC grating of FIGS. 7A and 7B of the beam redirecting module of FIG. 6, showing light propagation in OFF (FIG. 8A) and ON (FIG. 8B) states;

DETAILED DESCRIPTION

Figure 1A:
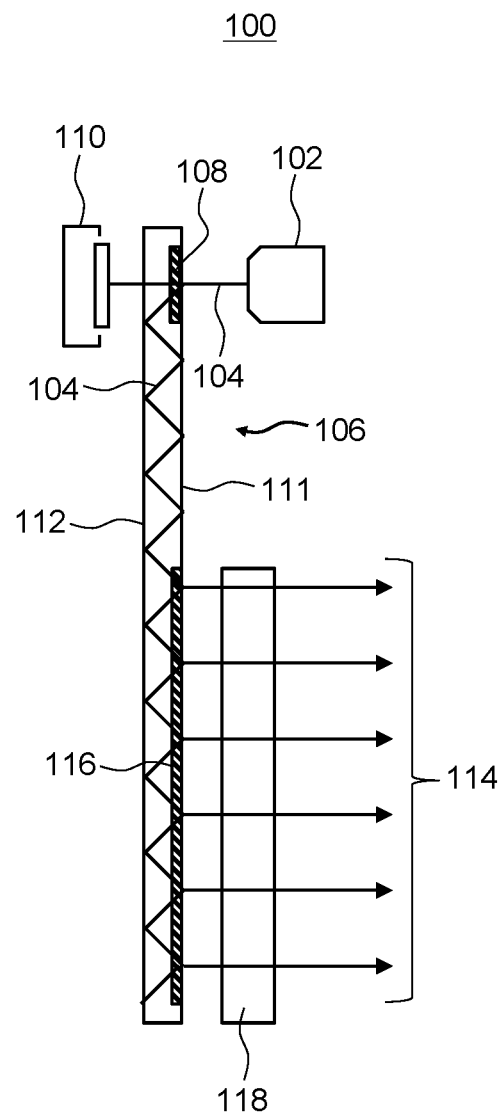
FIG. 1A is a top cross-sectional view of a directional illuminator at a normal angle of illumination of a display panel.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A, 1B to FIG. 6 and FIG. 12, similar reference numerals denote similar elements.

A display device provides image light carrying an image for observation by a user. The image light is typically provided over a large area including all possible locations of the display viewer(s). In accordance with this disclosure, the image light may be delivered specifically to the area where the viewer's eyes or even eye pupils are located, enabling the image brightness improvement and/or energy savings due to not sending the image light to areas where it cannot be observed. The image light may be produced by a directional illuminator including a light source, a pupil-replicating lightguide, and a tiltable reflector for in-coupling the light from the light source into the pupil-replicating lightguide at a variable angle. This causes the angle of the light at the output of the pupil-replicating lightguide to vary. The illuminating light may be coupled to a display panel in such a manner that the spatially modulated light downstream of the display panel is always directed at the user's eyes.

In accordance with the present disclosure, there is provided a directional illuminator for a display panel, e.g. a transmissive or reflective display panel. The directional illuminator comprises a light source for providing a light beam, a pupil-replicating lightguide, and a tiltable reflector for receiving the light beam from the light source and redirecting the light beam towards the pupil-replicating lightguide at a variable incidence angle. The pupil-replicating lightguide is configured to propagate the light beam therein by reflection from opposed surfaces of the pupil-replicating lightguide, and to out-couple offset parallel portions of the light beam along at least one of the opposed surfaces at a variable out-coupling angle corresponding to the variable incidence angle of the light beam. The pupil-replicating lightguide may include an in-coupling grating for in-coupling the light beam into the pupil-replicating lightguide at a variable in-coupling angle corresponding to the variable incidence angle of the light beam, and/or an out-coupling grating for out-coupling the offset parallel portions of the light beam at the variable out-coupling angle corresponding to the variable incidence angle of the light beam. The tiltable reflector may include a microelectromechanical system (MEMS) tiltable mirror.

A quarter-wave plate (QWP) may be provided in an optical path between the pupil-replicating lightguide and the tiltable reflector. In this embodiment, the in-coupling grating is polarization-selective, such that light at a first polarization propagates through the in-coupling grating substantially without changing direction of propagation, whereas light at a second, orthogonal polarization is redirected by the in-coupling grating. The light source may be configured to provide the light beam at the first polarization to propagate in sequence through the in-coupling grating of the pupil-replicating lightguide, through the QWP, impinge onto the tiltable reflector, and get reflected by the tiltable reflector to propagate back through the QWP, whereby the light beam acquires the second polarization after propagating back through the QWP, impinges onto the in-coupling grating and is redirected thereby at the variable in-coupling angle to propagate in the pupil-replicating lightguide.

In some embodiments, the in-coupling grating comprises a polarization volume hologram (PVH), which is polarization-selective: light at a circular polarization of a first handedness propagates through the PVH substantially without changing direction of propagation, whereas light at a circular polarization of a second, opposite handedness is redirected by the PVH. The light source may be configured to provide the light beam at the circular polarization of the first handedness to propagate through the in-coupling grating of the pupil-replicating lightguide, impinge onto the tiltable reflector, and get reflected by the tiltable reflector, whereby the light beam acquires the circular polarization of the second handedness, impinges onto the PVH and is redirected thereby at the variable in-coupling angle to propagate in the pupil-replicating lightguide.

In some embodiments, the out-coupling grating is polarization-selective, such that light at a first polarization propagates through the out-coupling grating substantially without changing direction of propagation, whereas light at a second, orthogonal polarization is out-coupled by the out-coupling grating from the pupil-replicating lightguide. The directional illuminator may include an array of tunable polarization rotators optically coupled to the pupil-replicating lightguide along at least one of its opposed surfaces and configured to tune a polarization state of the light beam propagating in the pupil-replicating lightguide in a spatially-selective manner. The array of tunable polarization rotators and the out-coupling grating may be disposed on opposite sides of the pupil-replicating lightguide. A controller may be operably coupled to the tiltable reflector and the array of tunable polarization rotators and configured to tune the polarization state of the light beam propagating in the pupil-replicating lightguide in coordination with tilting the tiltable reflector, so as to increase a spatial uniformity of optical power density of an output light beam at different angles of tilt of the tiltable reflector, the output light beam including the offset parallel portions of the light beam out-coupled by the out-coupling grating.

In accordance with the present disclosure, there is provided a display device including a directional illuminator described above and a display panel coupled to the directional illuminator for receiving and spatially modulating the offset parallel portions of the light beam to provide a spatially modulated light beam carrying an image in linear domain. An ocular lens may be coupled to the display panel for converting the image in linear domain into an image in angular domain for observation by a user. The display device may also include an eye tracking system for determining a position of an eye pupil of the user, and a controller operably coupled to the tiltable reflector and the eye tracking system and configured to tilt the tiltable reflector for steering the spatially modulated light beam to match the eye pupil position. The display panel of the display device may be a transmissive or reflective display panel.

In some embodiments of the display device, a beam redirecting module may be provided downstream of the display panel, for further redirection of the spatially modulated light beam. The tiltable reflector may be configured to redirect the light beam such that the out-coupled offset parallel portions of the light beam are redirected in a first plane, and the beam redirecting module may be configured to redirect the spatially modulated light beam in a second plane non-parallel, e.g. perpendicular, to the first plane. The beam redirecting module may include a stack of switchable gratings, e.g. Pancharatnam-Berry phase (PBP) liquid crystal (LC) switchable gratings.

In accordance with the present disclosure, there is further provided a method for directional illumination of a display panel. The method includes directing, by a tiltable reflector, a light beam emitted by a light source to a pupil-replicating lightguide at a variable incidence angle; propagating the light beam in the pupil-replicating lightguide by reflection from opposed surfaces of the pupil-replicating lightguide; and out-coupling offset parallel portions of the light beam from the pupil-replicating lightguide along at least one of its opposed surfaces at a variable out-coupling angle corresponding to the variable incidence angle, for illuminating the display panel with the out-coupled parallel portions of the light beam. The light beam may be in-coupled into the pupil-replicating lightguide in a polarization-selective manner. The method may further include tuning a polarization state of the light beam propagating in the pupil-replicating lightguide in a spatially-selective manner in coordination with tilting the tiltable reflector, so as to increase a spatial uniformity of optical power density of an output light beam at different angles of tilt of the tiltable reflector, wherein the output light beam comprises the offset parallel portions of the light beam.

Figure 1B:
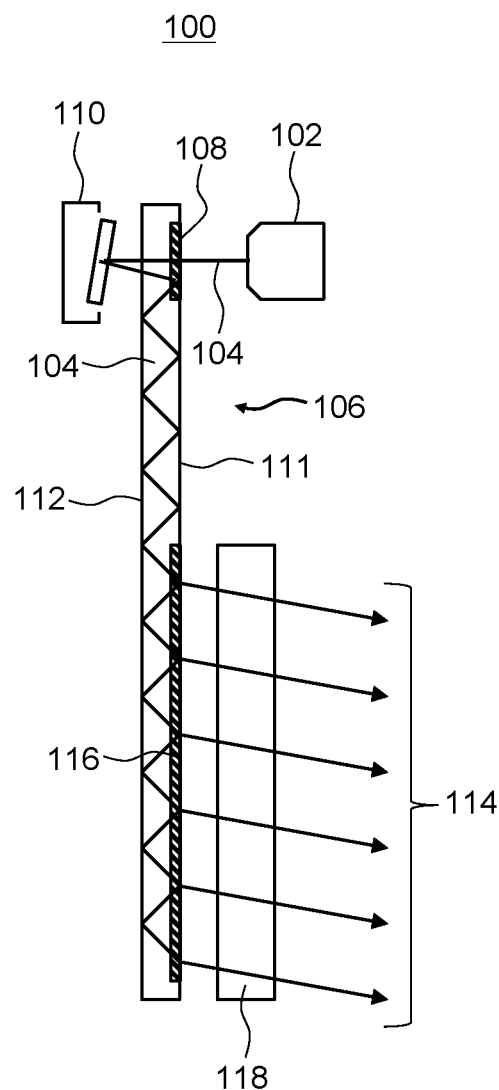
FIG. 1B is a top cross-sectional view of the directional illuminator of FIG. 1A at an acute angle of illumination of the display panel.

Referring now to FIGS. 1A and 1B, a directional illuminator 100 includes a light source 102 for providing a light beam 104. The light beam 104 may be collimated, diverging, or converging. In case of diverging or converging beams, the beam direction is defined by a chief ray of the propagating diverging or converging light beam. In the example of FIGS.

1A and 1B, the light beam 104 is collimated. A pupil-replicating lightguide 106 is used to expand the light beam 104 while preserving its directivity, including its direction of propagation and divergence/convergence. To achieve this function, the pupil-replicating lightguide 106 may include opposed first 111 and second 112 surfaces running parallel to one another. The light beam 104 may be in-coupled into the pupil-replicating lightguide 106 by an in-coupler 108 to propagate in the pupil-replicating lightguide 106 by a series of zigzag reflections, e.g. total internal reflections or TIRs, from the opposed first 111 and second 112 surfaces, as shown, i.e. in downward direction in FIGS. 1A and 1B. The light beam 104 is in-coupled into the pupil-replicating lightguide 106 at a variable in-coupling angle corresponding to the variable incidence angle of the light beam 104 onto the in-coupler 108.

The directional illuminator 100 further includes a tiltable reflector 110 for receiving the light beam 104 from the light source 102 and redirecting the light beam 104 towards the pupil-replicating lightguide 106 at a variable angle of incidence. In FIG. 1A, the light beam 104 is reflected by the tiltable reflector 110 at a nominal angle of 0 degrees i.e. at normal incidence, while in FIG. 1B, the light beam 104 is reflected by the tiltable reflector 110 at a non-zero or acute angle of incidence. The tiltable reflector 110, e.g. a micro-electromechanical system (MEMS) tiltable mirror, a magnetically tunable miniature bulk mirror, etc., may be tiltable about one axis, or may be independently tiltable about a pair of non-parallel, e.g. perpendicular, axes, for beam steering within a pre-determined solid angle.

The pupil-replicating lightguide 106 is configured to propagate the light beam 104 within the pupil-replicating lightguide 106 by reflection from the opposed first 111 and second 112 surfaces, and to out-couple offset parallel portions 114 of the light beam 104 along at least one of the opposed first 111 and second 112 surfaces at a variable out-coupling angle. The variable out-coupling corresponds to the variable incidence angle of the light beam 104 onto the in-coupler 108. The offset parallel portions 114 may be out-coupled from the pupil-replicating lightguide 106 by an out-coupling grating 116 at the variable out-coupling angle corresponding to the variable incidence angle of the light beam 104. The offset parallel portions 114 may illuminate a display panel 118, e.g. a transmissive or reflective spatial beam modulator (SLM) modulating the impinging light beam portions 114 in amplitude, phase, or both. The directional illuminator 100 coupled to the display panel 118 may be used in a display device, such as a TV set with a controllable viewing cone, a 3D TV set, a near-eye display (NED), etc.

Figure 2A:
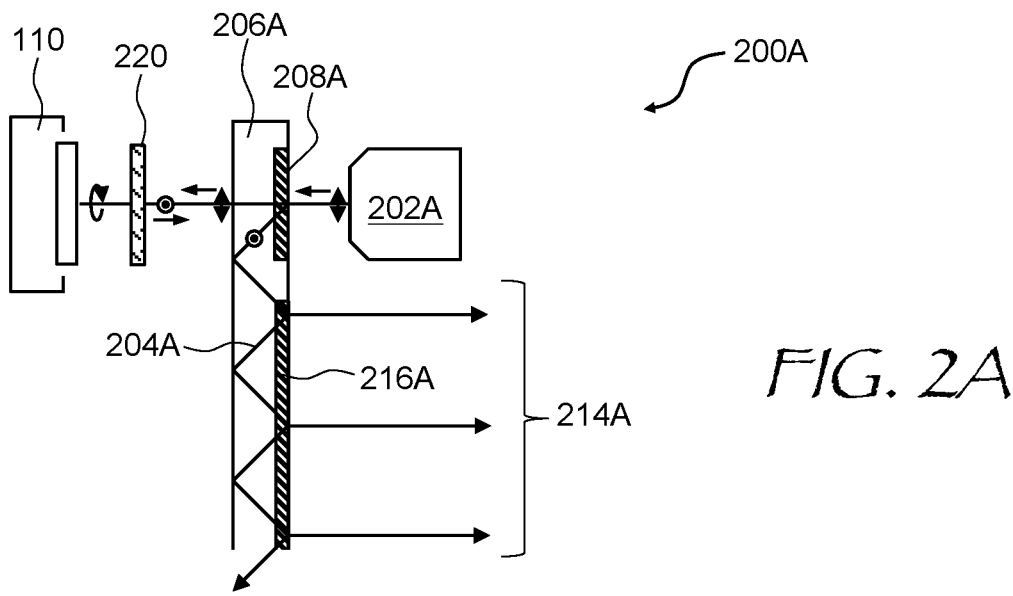
FIG. 2A is a magnified cross-sectional view of an embodiment of the directional illuminator of FIG. 1A with a linear polarization-selective in-coupling.

Referring now to FIG. 2A, a directional illuminator 200A is an embodiment of the directional illuminator 100 of FIGS. 1A and 1B, and includes similar elements. The directional illuminator 200A of FIG. 2A further includes a quarter-wave plate (QWP) 220 in an optical path between a pupil-replicating lightguide 206A and the tiltable reflector 110. An in-coupling grating 208A of the pupil-replicating lightguide 206A is polarization-selective. Light at a first linear polarization, in plane of FIG. 2A in this example, propagates through the in-coupling grating 208A substantially without changing the direction of propagation, whereas light at a second, orthogonal linear polarization, i.e. perpendicular to plane of FIG. 2A, is redirected by the polarization-selective in-coupling grating 208A so as to propagate within the pupil-replicating lightguide 206A. A light source 202A is configured to provide a light beam 204A in the first polarization state to propagate in sequence through the polarization-selective in-coupling grating 208A of the pupil-replicating lightguide 206A, through the QWP 220, impinge onto the tiltable reflector 110, and to get reflected by the tiltable reflector 110 to propagate back through the QWP 220, whereby the light beam 204A becomes circularly polarized in an optical path between the tiltable reflector 10 and the QWP 220 as indicated, and acquires the second polarization (linear orthogonal polarization in this example) after propagating back through the QWP 220. Then, the light beam 204A impinges onto the polarization-selective in-coupling grating 208A and is redirected by the polarization-selective in-coupling grating 208A at the variable in-coupling angle to propagate in the pupil-replicating lightguide 206A. Portions 214A of the light beam 204A are out-coupled from the pupil-replicating lightguide 206A by an out-coupling grating 216A, which may also be polarization-selective in some embodiments.

By way of a non-limiting example, the polarization-selective in-coupling grating 208A and/or the out-coupling grating 216A may include a grating layer formed from a liquid crystal (LC) layer having LC molecules oriented along a same axis, such that at the first polarization of incoming light, the refractive index is $n_1$, and for incoming light at the second polarization, the refractive index is $n_2$ not equal to $n_1$. The LC grating layer may be supported by or surrounded by an isotropic material with an index of refraction matched to $n_1$ and mismatched with $n_2$. In such a configuration, the refractive index contrast of the formed in-coupler grating is close to zero at the first polarization of impinging light, and is non-zero at the second polarization of the impinging light. This causes the grating to not diffract light at the first linear polarization while diffracting light at the second linear polarization.

Figure 2B:
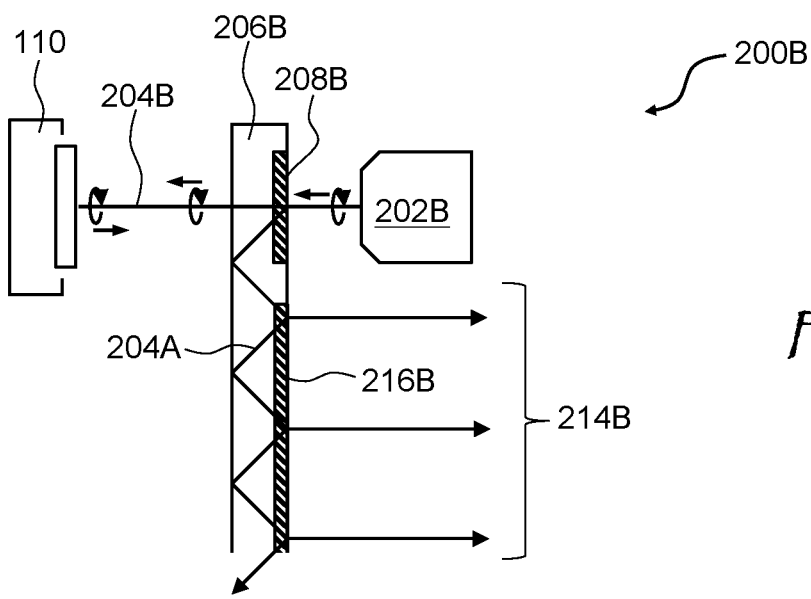
FIG. 2B is a magnified cross-sectional view of an embodiment of the directional illuminator of FIG. 1A with a circular polarization-selective in-coupling.

Turning to FIG. 2B, a directional illuminator 200B is an embodiment of the directional illuminator 100 of FIGS. 1A and 1B, and includes similar elements. The directional illuminator 200B of FIG. 2B includes a polarization volume hologram (PVH) in-coupling grating 208B that is selective to a directedness of a circular polarization. Circularly polarized light of a first handedness propagates through the PVH in-coupling grating 208B substantially without changing direction of propagation, whereas circularly polarized light of a second, opposite handedness is redirected, or diffracted, by the PVH in-coupling grating 208B. A light source 202B is configured to provide a light beam 204B at the circular polarization of the first handedness to propagate through the PVH in-coupling grating 208B of a pupil-replicating lightguide 206B, impinge onto the tiltable reflector 110 and get reflected by the tiltable reflector 110 at a variable angle. Upon reflection from the tiltable reflector 110, the light beam 204B acquires the circular polarization of the second, opposed handedness. This happens because while the direction of propagation reverses, the phase relationship between orthogonal linear polarization components of the impinging light beam 204B remains substantially unchanged because both linear polarization components impinge onto the reflector at a same angle of incidence. Then, the light beam 204B impinges onto the PVH coupling grating 208B again and is redirected by the PVH coupling grating 208B at the variable in-coupling angle to propagate in the pupil-replicating lightguide 206B. Portions 214B of the light beam 204B are out-coupled from the pupil-replicating lightguide 206B by an out-coupling grating 216B, which may also be polarization-selective, e.g. may include a circular polarization-selective PVH out-coupling grating.

It may be desirable to illuminate a display panel with a spatially uniform beam of light. It may also be desirable to selectively dim or emphasize certain areas of the display panel to enhance a local contrast. To both of those ends, a directional illuminator may include a spatial light modulator coupled to the pupil-replicating lightguide. By way of a non-limiting example, referring now to FIG. 3, a directional illuminator 300 is similar to the directional illuminator 100 of FIGS. 1A and 1B, and includes similar elements, including a light source 302 providing a polarized light beam 304, and including the tiltable reflector 110. The directional illuminator 300 of FIG. 3 has a pupil-replicating lightguide 306 supporting a polarization-selective in-coupling 308 and out-coupling 316 gratings, such as a LC or PVH gratings, for example.

Figure 3:
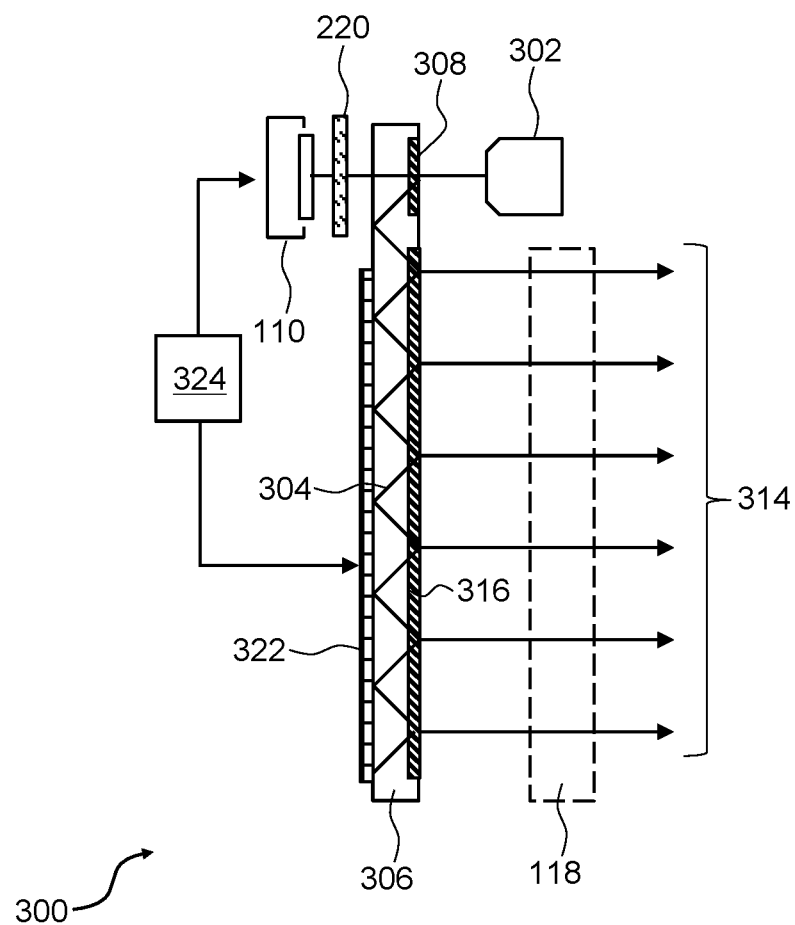
FIG. 3 is a cross-sectional view of a directional illuminator embodiment with an array of tunable polarization rotators for equalizing or pre-emphasizing lateral optical power density distribution of the output light beam.

The directional illuminator 300 further includes an array of tunable polarization rotators 322, for example an LC array, optically coupled to the pupil-replicating lightguide 306 along at least one of its opposed surfaces. In the embodiment of FIG. 3, the array of tunable polarization rotators 322 and the out-coupling grating 316 are disposed on the opposite sides of the pupil-replicating lightguide 306. The array of tunable polarization rotators 322 is configured to tune a polarization state of a light beam 304 propagating in the pupil-replicating lightguide 306 in a spatially-selective manner. For embodiments where the light beam 304 is linearly polarized, the array of tunable polarization rotators 322 may be configured to rotate polarization of the impinging light beam 304 such that some portions of the light beam 304 are rotated in polarization and some are not rotated, or rotated by a variable degree, or converted between linear and elliptical or circular polarizations, etc.

In operation, the light beam 304 is emitted by the light source 302 in a first polarization state, redirected by the tiltable reflector 110, and in-coupled into the pupil-replicating lightguide 306 by the polarization-selective in-coupler 308 after double-pass propagation through the QWP 220 that changes the polarization state from the first to the second, orthogonal polarization state. The polarized light beam 304 then propagates through the pupil-replicating lightguide 306 by a series of zigzag reflections as shown. Upon each reflection, the array of tunable polarization rotators 322 may change the polarization state of further propagating light beam 304. Thus, each portion 314 of the light beam 304 propagating towards the polarization-selective out-coupling grating 316 within the pupil-replicating lightguide 306 may have a different, controllable polarization state.

Portions of the light beam 304 in the first polarization state propagate through the out-coupling grating 316 substantially without changing direction of propagation i.e. without out-coupling, whereas portions of the light beam 304 in the second, orthogonal polarization state is out-coupled by the polarization-selective out-coupling grating 316 from the pupil-replicating lightguide 306. In other words, the polarization-selective out-coupling grating 316 operates as a polarization analyzer, only out-coupling light beam portions 314 having the second polarization, whatever it may be, e.g. linear for an LC grating, circular of a certain handedness for a PVH grating, etc. In this manner, a spatial non-uniformity of throughput of the pupil-replicating lightguide 306 may be compensated for, offset, or lessened. Furthermore, a desired spatial distribution of optical power density of the light beam portions 314 illuminating the display panel 118 may be achieved. For example, areas of low brightness of the image displayed by the display panel may be illuminated less, and areas of high brightness of the image may be illuminated more, increasing the apparent contrast of the display image.

The directional illuminator 300 may further include a controller 324 operably coupled to the tiltable reflector 110 and the array of polarization rotators 322 as shown. The controller 324 may be configured to tune the polarization state of the light beam 304 propagating in the pupil-replicating lightguide 306 in coordination with tilting the tiltable reflector 110, to increase a spatial uniformity of optical power density of an output light beam formed by the offset parallel light beam portions 314 at different angles of tilt of the tiltable reflector 110, or to pre-emphasize the image as the case may be.

Figure 4:
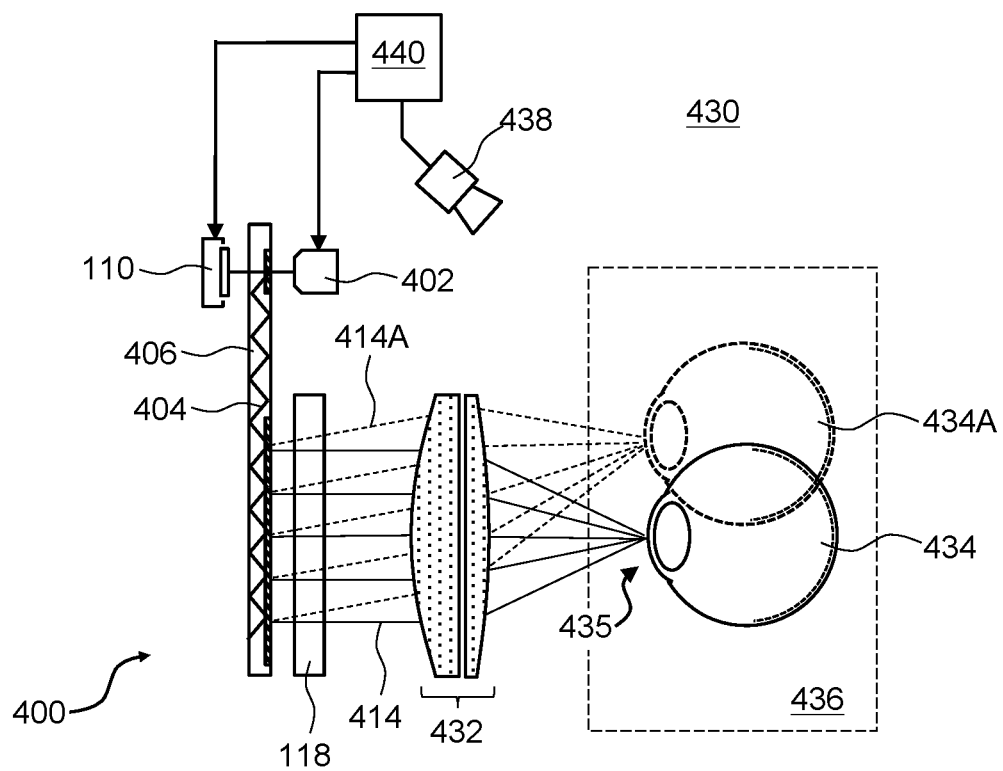
FIG. 4 is a schematic view of a near-eye display device of this disclosure.

Turning to FIG. 4, a near-eye display (NED) 430 includes a directional illuminator 400 such as, for example, any of the directional illuminators 100, 200A, 200B, and 300 of FIGS. 1A-1B, FIG. 2A, FIG. 2B, and FIG. 3 respectively. The directional illuminator 400 illuminates the display panel 118 with light beam portions 414 obtained from a light beam 404 emitted by a light source 402 and coupled into a pupil-replicating lightguide 406, which outputs the light beam portions 414 as explained above. An ocular lens 432 is coupled to the display panel 118 for converting an image in linear domain displayed by the display panel 118 into an image in angular domain for observation by a user's eye 434 placed at an eyebox 436. The display panel 118 operates in transmission in this example.

The NED 430 may further include an eye tracking system 438 configured for determining a position of an eye pupil 435 of the user's eye 434, and a controller 440 operably coupled to the tiltable reflector 110 and the eye tracking system 438 and configured to tilt the tiltable reflector 110 for tuning the out-coupling angle of light beam portions 414 to match the eye pupil 435 position. For example, when the eye 434 shifts to a new position shown with dashed lines at 434A, the eye tracking system 438 determines the new position, reports the new position to the controller 440, which then tilts the tiltable reflector 110 to provide deflected light beam portions 414A that are focused by the ocular lens 432 to converge on the new position 434A. Such a configuration enables the NED 430 to only send image light where the eye pupils are located, providing power savings and increasing perceived brightness of the observed image. In other words, the NED 430 enables steering of the exit pupil of the display to match the current eye pupil position.

Figure 5:
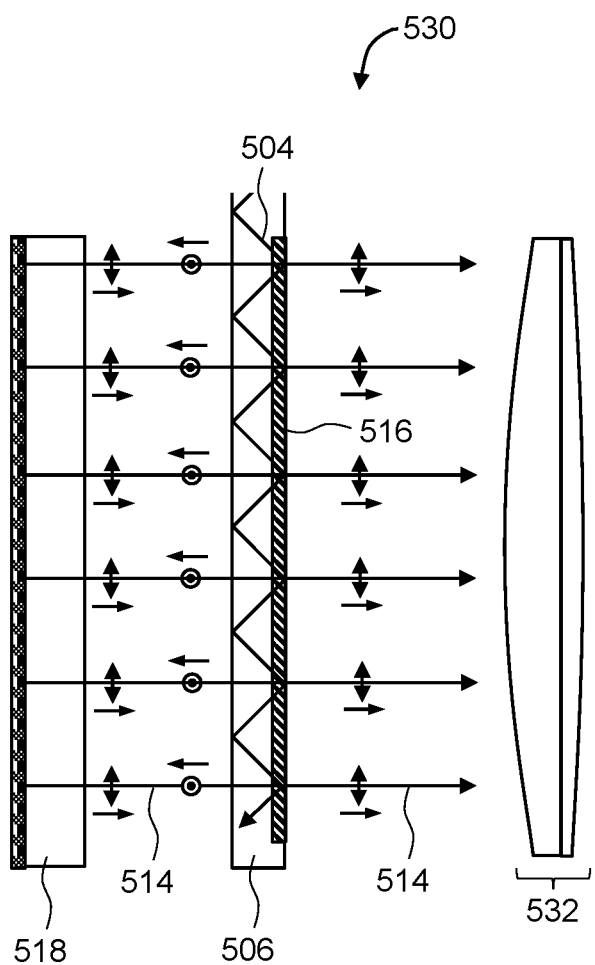
FIG. 5 is a partial cross-sectional view of a display device of this disclosure with a reflective display panel.

Configurations of display device are possible with transmissive or reflective display panels such as, for example, reflective liquid crystal on silicon (LCoS) display panels. LCoS display panels combine a possibility of miniaturization with the convenience of disposing the driving circuitry on the reflective silicon substrate of the LC array. Referring for an example to FIG. 5, a display device 530 is similar to the display device 430 of FIG. 4, but uses a reflective display panel instead of a transmissive display panel. The display device 530 includes a pupil-replicating lightguide 506 having an out-coupling polarization-selective grating 516. Portions 514 of a light beam 504 guided by the pupil-replicating lightguide 506 are out-coupled by the polarization-selective grating 516 at a linear polarization perpendicular to the plane of FIG. 5, as illustrated. The light beam portions 514 propagate towards a reflective display panel 518, e.g. an LCoS reflective display panel, which reflects the light beam portions 514 to propagate back towards the pupil-replicating lightguide 506 with a spatially variant polarization state. The light beam portions 514 at a linear polarization state in plane of FIG. 5 propagate freely through the polarization-selective grating 516, while the light beam portions 514 at the initial polarization state, that is, perpendicular to the plane of FIG. 5, are deviated (diffracted) by the polarization-selective grating 516 away from the optical path. As a result, the beam portions 514 propagated through the polarization-selective grating 516 (from left to right in FIG. 5) are modulated in amplitude providing an image in linear domain. The beam portions 514 can then be focused by an ocular lens 532 to convert the image in linear domain into an image in angular domain at a focal plane of the ocular lens 532.

Figure 6:
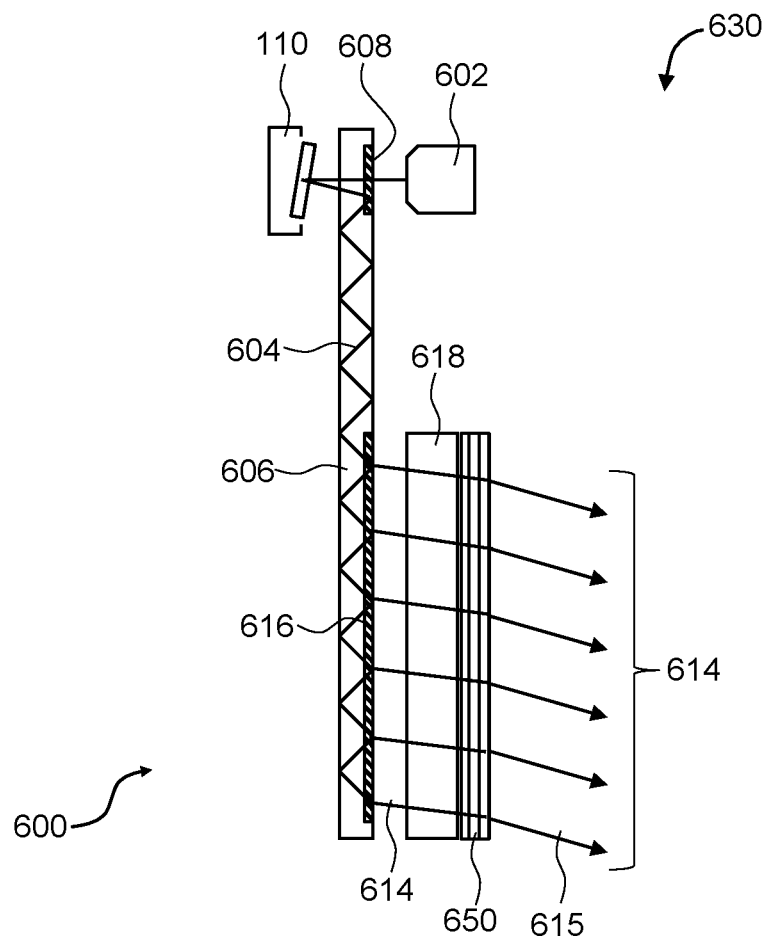
FIG. 6 is a top cross-sectional view of a display device with a directional illuminator and an additional beam redirecting module disposed downstream of the display panel.

Turning to FIG. 6, a display device 630 includes a directional illuminator 600 illuminating a display panel 618. The directional illuminator 600 may include any of the directional illuminators described above. In the embodiment of FIG. 6, the directional illuminator 600 includes a light source 602 and a pupil-replicating lightguide 606. In operation, the light source 602 provides a light beam 604, which is coupled into a pupil-replicating lightguide 606 by an in-coupling grating 608 of the pupil-replicating lightguide 606 after reflection from the tiltable reflector 110. The in-coupled light beam 604 propagates in the pupil-replicating lightguide 606 by a series of inner reflections from its opposed parallel surfaces. Portions 614 of the light beam 604 are out-coupled form the pupil-replicating lightguide 606 by an out-coupling grating 616 to propagate through the display panel 618, which spatially modulates the portions 614 to provide a modulated light beam 615. A beam redirecting module 650 may be disposed downstream of the display panel 618. The purpose of the beam redirecting module 650 is to further redirect the spatially modulated light beam 615.

In some embodiments, the tiltable reflector 110 is configured to redirect the light beam 604 such that the out-coupled offset parallel portions 614 of the light beam 604 are redirected in a first plane, while the beam redirecting module 650 is configured to redirect the spatially modulated light beam 615 in a second plane non-parallel to the first plane, for example in a perpendicular plane. This simplifies the construction of both the tiltable reflector 110 and the beam redirecting module 650. In some embodiments, the tiltable reflector 110 and the beam redirecting module 650 are each configured to deviate respective light beams in two directions, thus increasing the overall redirection angle and relaxing the requirements on the pupil-replicating lightguide 606 to propagate the light beam 604 within a certain angular range, i.e. reducing the angular range of propagation of the light beam 604 supported by the pupil-replicating lightguide 606. This enables, for example, a lightguide with lower index of refraction to be used.

The beam redirecting module 650 may be coupled to the display panel 618 downstream of the display panel 618, and may include a plurality of individual redirecting elements. By way of a non-limiting example, the beam redirecting module 650 may include a stack of switchable gratings, such as Pancharatnam—Berry phase (PBP) liquid crystal (LC) switchable gratings.

Figures 7A, 7B:
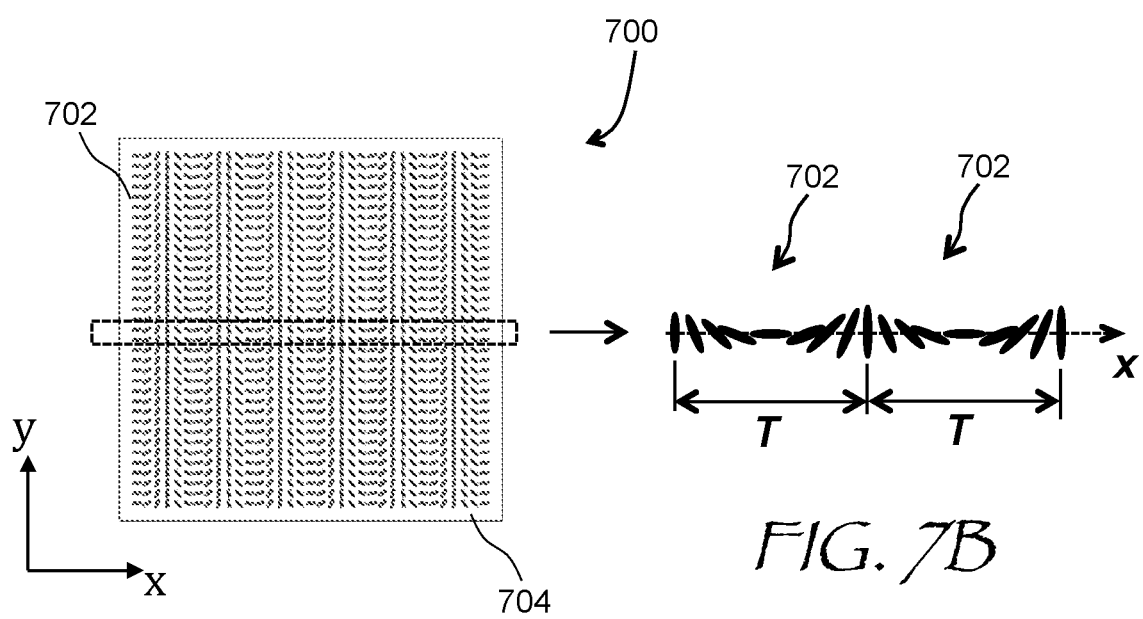
FIG. 7A is a frontal view of an active Pancharatnam-Berry phase (PBP) liquid crystal (LC) grating usable in the beam redirecting module of FIG. 6.
FIG. 7B is a magnified schematic view of LC molecules in an LC layer of the active PBP LC grating of FIG. 7A.

Referring to FIG. 7A, an active PBP LC grating 700 includes LC molecules 702 in an LC layer 704. The LC molecules 702 are disposed in XY plane at a varying in-plane orientation depending on the X coordinate. The orientation angle ϕ(x) (azimuthal angle) of the LC molecules 702 in the PBP LC grating 700 is given by $$\phi(x) = \pi x/T = \pi x \sin\theta/\lambda_o \quad (1)$$

where $\lambda_o$ is the wavelength of impinging light, T is a pitch of the grating 700, and θ is a diffraction angle given by $$\theta = \sin^{-1}(\lambda_o/T) \quad (2)$$

The azimuthal angle ϕ varies continuously across the surface of an LC layer 704 as illustrated in FIG. 7B, with a constant period equal to T. The optical phase delay P in the PBP LC grating 700 of FIG. 7A is due to the PBP effect, i.e. $P(x) = 2\phi(x)$ when the optical retardation $R = \lambda_o/2$.

FIGS. 8A and 8B illustrate the operation of PBP LC gratings such as the grating 700 of FIG. 7A. In FIG. 8A, an active PBP LC grating 800 is in OFF state, such that its LC molecules are disposed predominantly in substrate plane, that is, in XY plane in FIG. 8A. When an incoming light beam 815 is left-circular polarized (LCP), the PBP LC grating 800 redirects the light beam 815 upwards, which becomes right-circular polarized (RCP). The RCP deflected beam 815 is shown with solid lines. When an incoming light beam 815 is right-circular polarized (RCP), the PBP LC 800 redirects the beam 815 downwards, which becomes left-circular polarized (LCP). The LCP deflected beam 815 is shown with dashed lines. Applying a voltage V to the PBP LC grating 800 reorients the LC molecules along Z-axis, perpendicular to the substrate plane, as shown in FIG. 8B. At this orientation of LC molecules, the light beam 815 retains its original direction, whether it is LCP or RCP. Thus, the active PBP LC grating 800 has a variable beam steering property.

Figure 9:
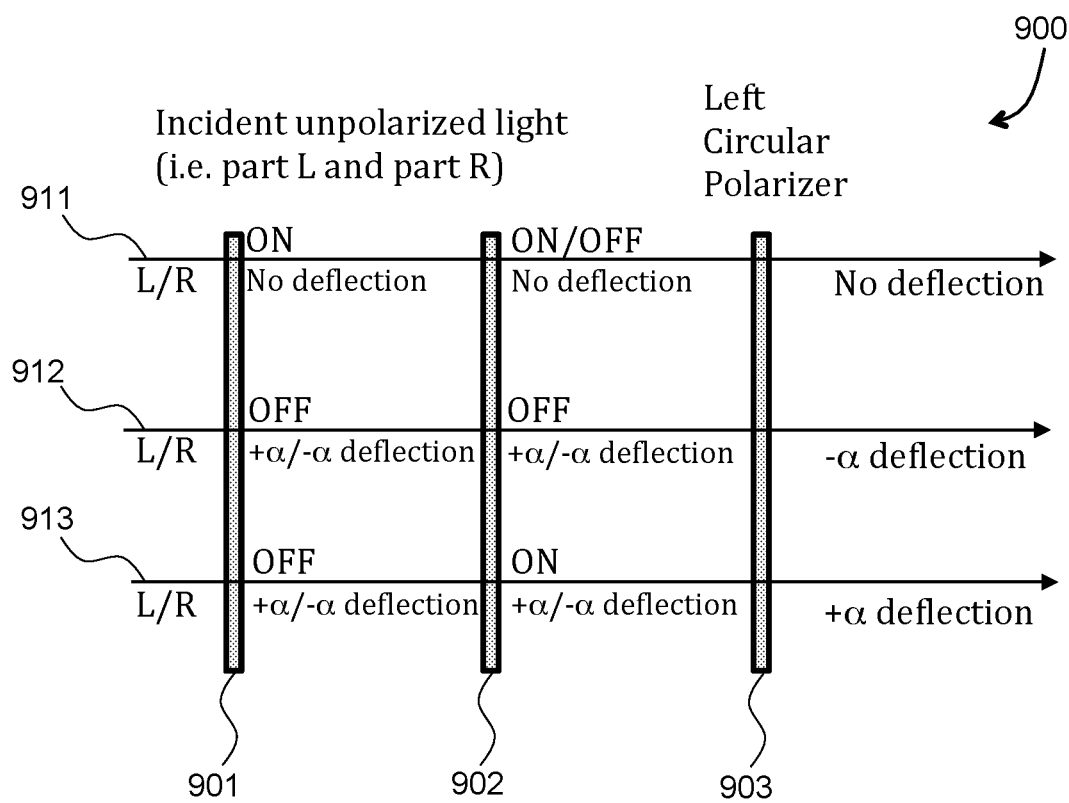
FIG. 9 is a schematic side view of an optical subassembly including the active PBP LC grating of FIGS. 7A-7B and 8A-8B, the stack being capable of switching between three distinct directions of propagation.

In accordance with this disclosure, the above described active PBP LC gratings may be used to construct a beam deflection element switchable between three beam deflection angles. Referring to FIG. 9, a beam deflection element 900 includes a stack of an active PBP LC grating 901, an LC switchable half-wave plate 902, and a left-circular polarizer 903. In this example, the active PBP LC grating 901 includes positive LC material, i.e. an LC material showing positive dielectric anisotropy, although a negative LC material could also be used. In this example, the input light is not polarized, i.e. the input light includes both left-handed circular (L) and right-handed circular (R) polarizations. When the PBP LC grating 901 is in "ON" state, i.e. when the electric field is applied, the PBP structure is erased, thus the PBP LC grating 901 does not deflect the light beam; as denoted at 911, no overall beam deflection occurs. When the PBP LC grating 901 is in "OFF" state, i.e. when the electric field is not applied, the PBP LC orientation is present, providing the deflection of the light beam by the angle α for L-polarized light and −α for R-polarized light. When the switchable half-wave waveplate 902 is in OFF state, i.e. when the electric field is not applied, the half-wave retardation is present, as denoted at 912. As a result, the R-polarized light at the deflection angle −α becomes L-polarized light, which is passed through the left-circular polarizer 903. Thus, the beam deflection element 900 deflects the light beam by the angle of −α. When the switchable half-wave waveplate 902 is in ON state, i.e. when the electric field is applied, the half-wave retardation is erased, and the L-polarized light remains L-polarized, as denoted at 913. Thus, the beam deflection element 900 deflects the light beam by the angle α.

Figure 10:
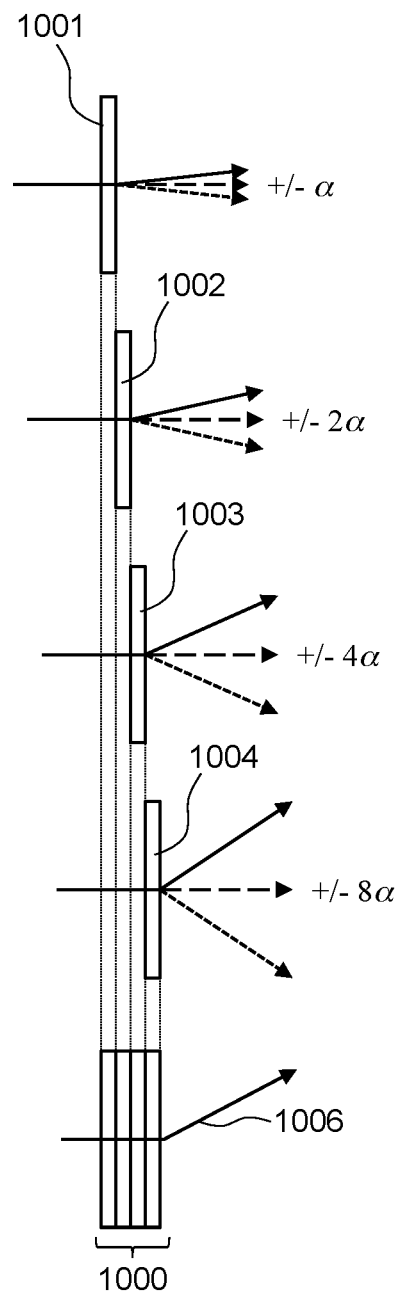
FIG. 10 is an exploded view of a variant of the beam redirecting module of FIG. 6 including a binary stack of optical subassemblies of FIG. 9.

In accordance with an aspect of this disclosure, the beam redirecting module 650 of FIG. 6 may include a stack of switchable gratings such as the PBP LC gratings 800 of FIGS. 8A, 8B, for example. The PBP LC gratings 800 may be included into beam deflection elements 900 as explained above with reference to FIG. 9. Beam deflection elements with different magnitudes of deflection may be combined in stacks, which may have the switchable deflection angles in a binary relationship to one another. Referring to FIG. 10 for a non-limiting illustrative example, a binary stack 1000 of switchable deflection elements includes a first switchable deflection element 1001 providing switchable deflection between angles of −α, 0, +α; a second switchable deflection element 1002 providing switchable deflection between angles of −2α, 0, +2α; a third switchable deflection element 1003 providing switchable deflection between angles of −4α, 0, +4α; and a fourth switchable deflection element 1004 providing switchable deflection between angles of −8α, 0, +8α. Together, the switchable deflection elements 1001-1004 of the stack 1000 may deviate a light beam 1006 by an angular range from −15α to 15α.

The above examples of PBP LC gratings considered the light beam deviation only in one plane. To achieve a light beam deviation in two orthogonal planes, two PBP LC gratings, or two stacks of such gratings may be disposed at 90 degrees clocking angle w.r.t. each other. For example, for each PBP LC grating 700 (FIG. 7A) with the azimuthal angle $\phi_1$ varying along X-axis, $\phi_1 = \phi(x)$, the stack may include one PBP LC grating 700 with the azimuthal angle $\phi_2$ varying along Y-axis, $\phi_2 = \phi(y)$.

Figure 11:
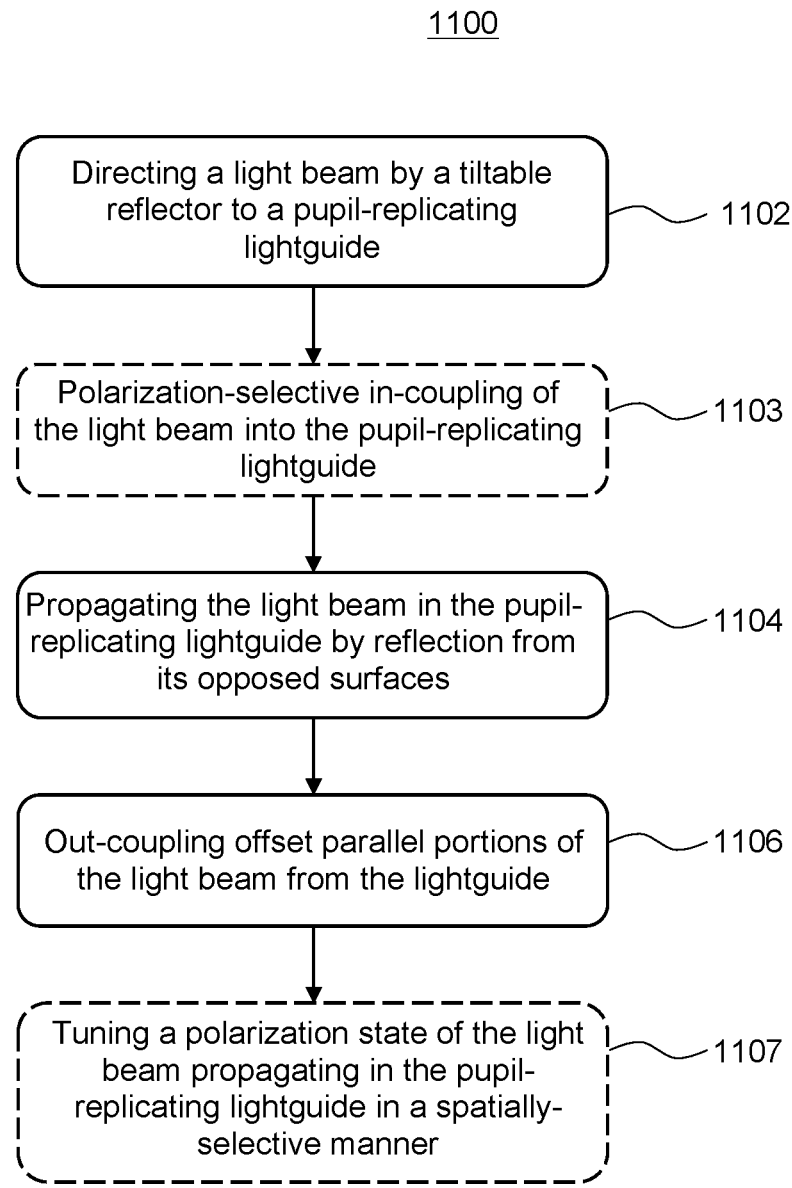
FIG. 11 is a flow chart of a method for directional illumination of a display panel in accordance with this disclosure.

Turning to FIG. 11, a method 1100 for directional illumination of a display panel includes directing (1102), by a tiltable reflector such as the tiltable reflector 110, for example, a light beam (e.g. the light beam 104 of FIG. 1A) emitted by a light source (e.g. the light source 102) to a pupil-replicating lightguide (e.g. the pupil-replicating lightguide 106) at a variable incidence angle, as illustrated in FIGS. 1A and 1B.

The method 1100 further includes propagating (1104) the light beam in the pupil-replicating lightguide by reflection (e.g. TIR) from opposed surfaces of the pupil-replicating lightguide, as illustrated in FIGS. 1A and 1B, for example. Offset parallel portions of the light beam are out-coupled (FIG. 11; 1106) from the pupil-replicating lightguide along at least one of its opposed surfaces at a variable out-coupling angle corresponding to the variable incidence angle, for illuminating the display panel with the out-coupled portions of the light beam.

The method 1100 may include polarization-selective in-coupling (1103) of the light beam into the pupil-replicating lightguide. The above FIGS. 2A and 2B provide a non-limiting illustrative example of the polarization-selective in-coupling and out-coupling. The method 1100 may further include tuning (1107) a polarization state of the light beam propagating in the pupil-replicating lightguide in a spatially-selective manner in coordination with tilting the tiltable reflector, so as to increase a spatial uniformity of optical power density of an output light beam at different angles of tilt of the tiltable reflector. Here, the output light beam includes the offset parallel portions of the light beam out-coupled by the out-coupling grating. A non-limiting example of the polarization-selective tuning has been given above with reference to FIG. 3.

Figure 12:
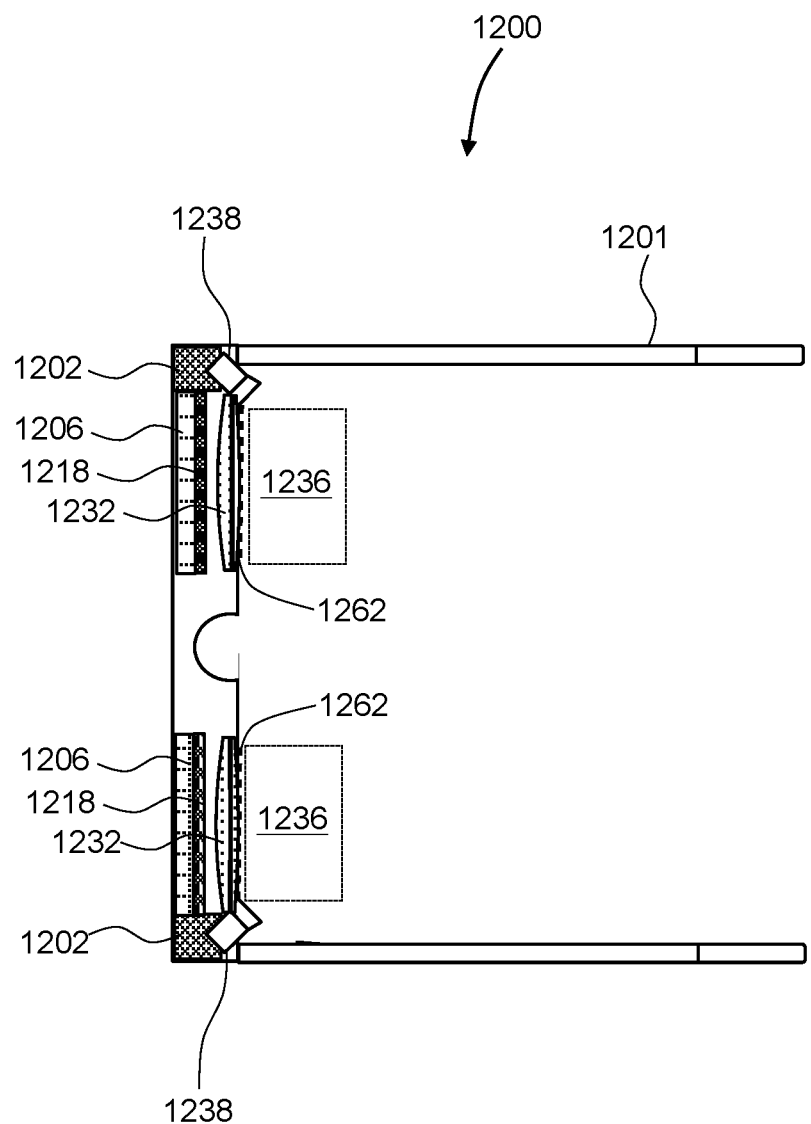
FIG. 12 is a view of near-eye display of this disclosure, the display having the form factor of a pair of eyeglasses.

Turning to FIG. 12, an augmented reality (AR) near-eye display 1200 includes a frame 1201 supporting, for each eye: a light source 1202 including a tiltable reflector for varying a beam angle of an emitted light beam as disclosed herein; a pupil-replicating lightguide 1206 for guiding the light beam inside and out-coupling portions of the light beam as disclosed herein; a display panel 1218 illuminated by the light beam portions out-coupled from the pupil-replicating lightguide 1206 for spatially modulating the light beam portions; an ocular lens 1232 for converting an image in linear domain displayed by the display panel 1218 into an image in angular domain at an eyebox 1236 as disclosed herein; an eye-tracking camera 1238; and a plurality of eyebox illuminators 1262, shown as black dots. The eyebox illuminators 1262 may be supported by ocular lens 1232 for illuminating an eyebox 1236.

The purpose of the eye-tracking cameras 1238 is to determine position and/or orientation of both eyes of the user to enable steering the output image light to the locations of the user's eyes as disclosed herein. The illuminators 1262 illuminate the eyes at the corresponding eyeboxes 1236, to enable the eye-tracking cameras 1238 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1262, the light illuminating the eyeboxes 1236 may be made invisible to the user. For example, infrared light may be used to illuminate the eyeboxes 1236.

Figure 13:
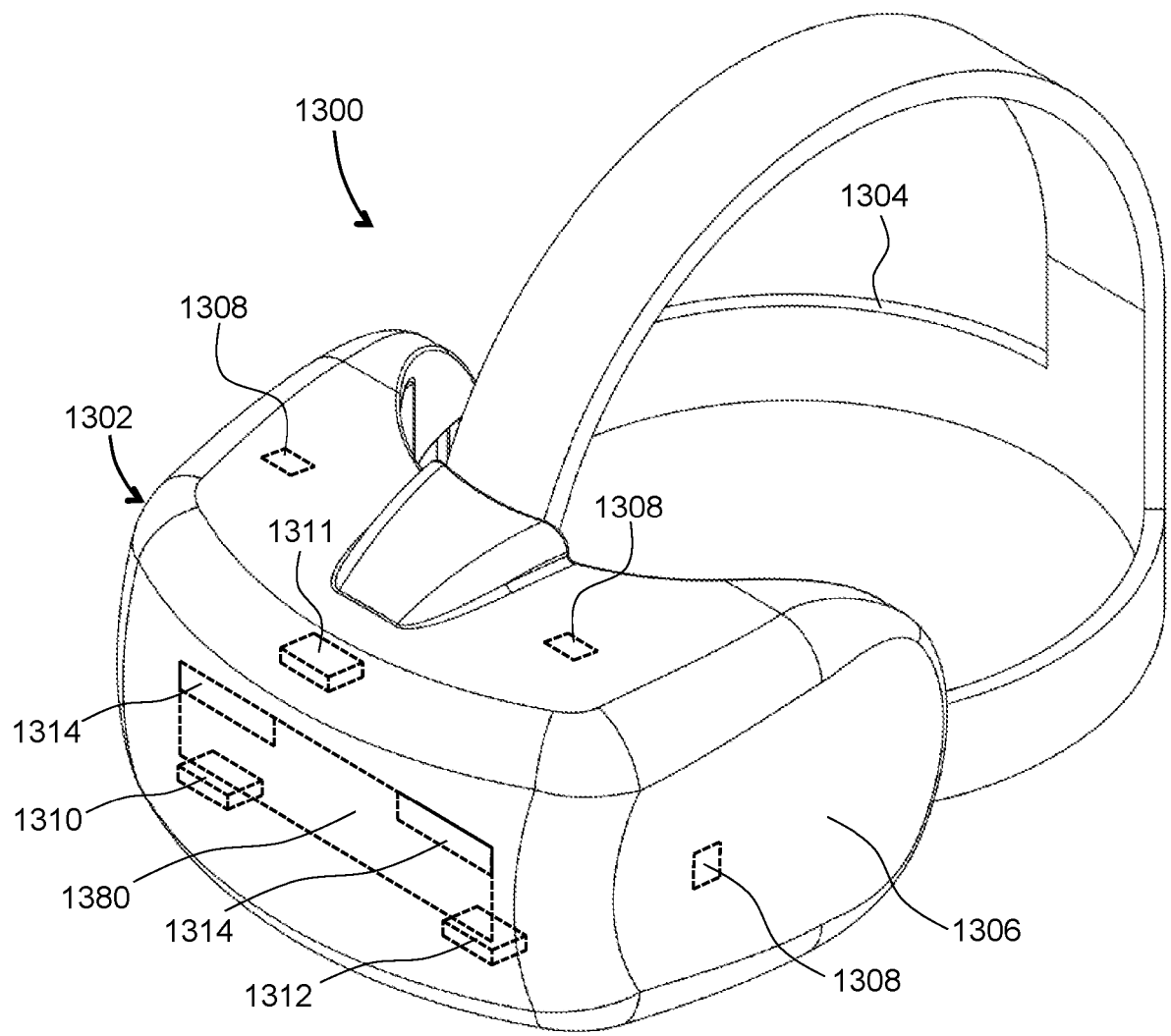
FIG. 13 is a three-dimensional view of a head-mounted display of this disclosure.

Turning to FIG. 13, an HMD 1300 is an example of an AR/VR wearable display system which encloses the user's face, for a greater degree of immersion into the AR/VR environment. The HMD 1300 may generate the entirely virtual 3D imagery. The HMD 1300 may include a front body 1302 and a band 1304 that can be secured around the user's head. The front body 1302 is configured for placement in front of eyes of a user in a reliable and comfortable manner. A display system 1380 may be disposed in the front body 1302 for presenting AR/VR imagery to the user. The display system 1380 may include any of the display devices and illuminators disclosed herein. Sides 1306 of the front body 1302 may be opaque or transparent.

In some embodiments, the front body 1302 includes locators 1308 and an inertial measurement unit (IMU) 1310 for tracking acceleration of the HMD 1300, and position sensors 1312 for tracking position of the HMD 1300. The IMU 1310 is an electronic device that generates data indicating a position of the HMD 1300 based on measurement signals received from one or more of position sensors 1312, which generate one or more measurement signals in response to motion of the HMD 1300. Examples of position sensors 1312 include: one or more accelerometers, one or more gyroscopes, one or more magnetometers, another suitable type of sensor that detects motion, a type of sensor used for error correction of the IMU 1310, or some combination thereof. The position sensors 1312 may be located external to the IMU 1310, internal to the IMU 1310, or some combination thereof.

The locators 1308 are traced by an external imaging device of a virtual reality system, such that the virtual reality system can track the location and orientation of the entire HMD 1300. Information generated by the IMU 1310 and the position sensors 1312 may be compared with the position and orientation obtained by tracking the locators 1308, for improved tracking accuracy of position and orientation of the HMD 1300. Accurate position and orientation is important for presenting appropriate virtual scenery to the user as the latter moves and turns in 3D space.

The HMD 1300 may further include a depth camera assembly (DCA) 1311, which captures data describing depth information of a local area surrounding some or all of the HMD 1300. The depth information may be compared with the information from the IMU 1310, for better accuracy of determination of position and orientation of the HMD 1300 in 3D space.

The HMD 1300 may further include an eye tracking system 1314 for determining orientation and position of user's eyes in real time. The obtained position and orientation of the eyes also allows the HMD 1300 to determine the gaze direction of the user and to adjust the image generated by the display system 1380 accordingly. The determined gaze direction and vergence angle may be used to adjust the display system 1380 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1302.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A directional illuminator for a display panel, the directional illuminator comprising:
   a light source for providing a light beam;
   a pupil-replicating lightguide; and
   a tiltable reflector for receiving the light beam from the light source and redirecting the light beam towards the pupil-replicating lightguide at a variable incidence angle;
   wherein the pupil-replicating lightguide is configured to propagate the light beam therein by reflection from opposed surfaces of the pupil-replicating lightguide;
   the pupil-replicating lightguide comprising a polarization-selective out-coupling grating for propagating light at a first polarization therethrough substantially without changing direction of propagation and for out-coupling light at a second, orthogonal polarization state from the pupil-replicating lightguide, such that offset parallel portions of the light beam at the second polarization state are out-coupled along at least one of the opposed surfaces at a variable out-coupling angle corresponding to the variable incidence angle of the light beam;
   the directional illuminator further comprising an array of tunable polarization rotators optically coupled to the pupil-replicating lightguide along at least one of its opposed surfaces and configured to tune a polarization state of the light beam propagating in the pupil-replicating lightguide in a spatially-selective manner.

2. The directional illuminator of claim 1, wherein the pupil-replicating lightguide comprises an in-coupling grating for in-coupling the light beam into the pupil-replicating lightguide at a variable in-coupling angle corresponding to the variable incidence angle of the light beam.

3. The directional illuminator of claim 2, further comprising a quarter-wave plate (QWP) in an optical path between the pupil-replicating lightguide and the tiltable reflector, wherein the in-coupling grating is polarization-selective, such that light at the first polarization propagates through the in-coupling grating substantially without changing direction of propagation, whereas light at the second polarization is redirected by the in-coupling grating;
   wherein the light source is configured to provide the light beam at the first polarization to propagate in sequence through the in-coupling grating of the pupil-replicating lightguide, through the QWP, impinge onto the tiltable reflector, and get reflected by the tiltable reflector to propagate back through the QWP, whereby the light beam acquires the second polarization after propagating back through the QWP, impinges onto the in-coupling grating and is redirected thereby at the variable in-coupling angle to propagate in the pupil-replicating lightguide.

4. The directional illuminator of claim 2, wherein the in-coupling grating comprises a polarization volume hologram (PVH), wherein light at a circular polarization of a first handedness propagates through the PVH substantially without changing direction of propagation, whereas light at a circular polarization of a second, opposite handedness is redirected by the PVH; and
   wherein the light source is configured to provide the light beam at the circular polarization of the first handedness to propagate through the in-coupling grating of the pupil-replicating lightguide, impinge onto the tiltable reflector, and get reflected by the tiltable reflector, whereby the light beam acquires the circular polarization of the second handedness, impinges onto the PVH and is redirected thereby at the variable in-coupling angle to propagate in the pupil-replicating lightguide.

5. The directional illuminator of claim 1, wherein the tiltable reflector comprises a microelectromechanical system (MEMS) tiltable mirror.

6. The directional illuminator of claim 1, wherein the array of tunable polarization rotators and the polarization-selective out-coupling grating are disposed on opposite sides of the pupil-replicating lightguide.

7. The directional illuminator of claim 1, further comprising a controller operably coupled to the tiltable reflector and the array of tunable polarization rotators and configured to tune the polarization state of the light beam propagating in the pupil-replicating lightguide in coordination with tilting the tiltable reflector, so as to increase a spatial uniformity of optical power density of an output light beam at different angles of tilt of the tiltable reflector, wherein the output light beam comprises the offset parallel portions of the light beam out-coupled by the polarization-selective out-coupling grating.

8. A display device comprising:
a directional illuminator comprising:
  a light source for providing a light beam;
  a pupil-replicating lightguide;
  a tiltable reflector for receiving the light beam from the light source and redirecting the light beam towards the pupil-replicating lightguide at a variable incidence angle, wherein the pupil-replicating lightguide is configured to propagate the light beam therein by reflection from opposed surfaces of the pupil-replicating lightguide, and to out-couple offset parallel portions of the light beam along at least one of the opposed surfaces at a variable out-coupling angle corresponding to the variable incidence angle of the light beam; and
a display panel coupled to the directional illuminator for receiving and spatially modulating the offset parallel portions of the light beam to provide a spatially modulated light beam carrying an image in linear domain.

9. The display device of claim 8, further comprising an ocular lens coupled to the display panel for converting the image in linear domain into an image in angular domain for observation by a user.

10. The display device of claim 9, further comprising:
an eye tracking system for determining a position of an eye pupil of the user; and
a controller operably coupled to the tiltable reflector and the eye tracking system and configured to tilt the tiltable reflector for steering the spatially modulated light beam to match the eye pupil position.

11. The display device of claim 8, wherein the display panel comprises a reflective display panel.

12. The display device of claim 8, further comprising a beam redirecting module downstream of the display panel, for further redirection of the spatially modulated light beam.

13. The display device of claim 12, wherein the tiltable reflector is configured to redirect the light beam such that the out-coupled offset parallel portions of the light beam are redirected in a first plane, and wherein the beam redirecting module is configured to redirect the spatially modulated light beam in a second plane non-parallel to the first plane.

14. The display device of claim 12, wherein the beam redirecting module comprises a stack of switchable gratings.

15. The display device of claim 14, wherein the stack of switchable gratings comprises Pancharatnam-Berry phase (PBP) liquid crystal (LC) switchable gratings.

16. A method for directional illumination of a display panel, the method comprising:
directing, by a tiltable reflector, a light beam emitted by a light source to a pupil-replicating lightguide at a variable incidence angle;
polarization-selective in-coupling of the light beam into the pupil-replicating lightguide;
propagating the light beam in the pupil-replicating lightguide by reflection from opposed surfaces of the pupil-replicating lightguide; and
out-coupling offset parallel portions of the light beam from the pupil-replicating lightguide along at least one of its opposed surfaces at a variable out-coupling angle corresponding to the variable incidence angle, for illuminating the display panel with the out-coupled parallel portions of the light beam.

17. The method of claim 16, further comprising tuning a polarization state of the light beam propagating in the pupil-replicating lightguide in a spatially-selective manner in coordination with tilting the tiltable reflector, so as to increase a spatial uniformity of optical power density of an output light beam at different angles of tilt of the tiltable reflector, wherein the output light beam comprises the offset parallel portions of the light beam.

* * * * *